US008619546B2

(12) United States Patent
Nandagopal et al.

(10) Patent No.: US 8,619,546 B2
(45) Date of Patent: Dec. 31, 2013

(54) METHOD AND APPARATUS FOR COPING WITH LINK FAILURES IN CENTRAL CONTROL PLANE ARCHITECTURES

(75) Inventors: Thyaga Nandagopal, Edison, NJ (US); Maulik Desai, Ossining, NY (US)

(73) Assignee: Alcatel Lucent, Paris (FR)

( * ) Notice: Subject to any disclaimer, the term of this patent is extended or adjusted under 35 U.S.C. 154(b) by 312 days.

(21) Appl. No.: 12/858,050

(22) Filed: Aug. 17, 2010

(65) Prior Publication Data

US 2012/0044813 A1      Feb. 23, 2012

(51) Int. Cl.
*H04J 3/14* (2006.01)

(52) U.S. Cl.
USPC ............................................. 370/216; 370/241

(58) Field of Classification Search
None
See application file for complete search history.

(56) References Cited

U.S. PATENT DOCUMENTS

| | | | |
|---|---|---|---|
| 2005/0276216 A1* | 12/2005 | Vasseur et al. ................. | 370/222 |
| 2009/0138577 A1* | 5/2009 | Casado et al. ................. | 709/220 |
| 2009/0245097 A1* | 10/2009 | Takakuwa ..................... | 370/217 |
| 2010/0189113 A1* | 7/2010 | Csaszar et al. ................ | 370/400 |
| 2010/0189324 A1* | 7/2010 | Wollenweber et al. ........ | 382/131 |
| 2010/0208584 A1* | 8/2010 | Sone et al. ..................... | 370/228 |
| 2010/0232322 A1* | 9/2010 | Umayabashi et al. ......... | 370/256 |
| 2011/0085440 A1* | 4/2011 | Owens et al. .................. | 370/216 |
| 2011/0286324 A1* | 11/2011 | Bellagamba et al. .......... | 370/219 |

OTHER PUBLICATIONS

M. Desai, T. Nandagopal, "Coping with Link Failures in Centralized Control Plane Architectures," 2010 IEEE.
A.Greenberg et al., "A Clean Slate 4D Approach to Network Control and Management," ACM SIGCOMM Computer Comm. Rev., vol. 35, No. 5, Oct. 2005, pp. 41-54.
R. Ramjee et al., "Separating Control Software from Routers,"In COMSWARE, IEEE, 2006.
T. V. Lakshman et al., "The SoftRouter Architecture," In In HotNets-III, 2004.

* cited by examiner

*Primary Examiner* — Chi Pham
*Assistant Examiner* — Soon-Dong D Hyun
(74) *Attorney, Agent, or Firm* — Wall & Tong, LLP

(57) ABSTRACT

A capability for coping with link failures in central control plane architectures is provided. The capability for coping with link failures enables targeted reporting of link failures within the network in a manner that prevents flooding of link failure messages (LFMs) within the network. A method for reporting a failure of a link associated with a node includes detecting a failure of a link associated with the node, identifying an interface of the node associated with the failed link, identifying, from a flow table of the node, an ingress interface of the node via which a flow intended for the failed link is received, generating an LFM for the identified ingress interface, and sending the LFM via the identified ingress interface. A method for use at a local node having a flow table includes receiving an LFM indicative of a link failure detected at a remote node where the LFM includes a flow definition of a flow received at the remote node from the local node, identifying an interface of the local node via which the LFM is received, identifying from the flow table of the local node an ingress interface of the local node via which a flow intended for the failed link is received, generating a new LFM for the identified ingress interface of the node, and sending the new LFM via the identified ingress interface of the local node.

20 Claims, 12 Drawing Sheets

Algorithm 1 Algorithm for LFM initiator upon detecting broken link on port *brkPrt*. *FlowDict* is a dictionary / hash table whose keys are the ingress ports that bring in the flows going toward *brkPrt*, and the values are the lists including the definition of these flows. *SendMsg(prt, msg)* is a function that sends out a message (msg) through port (prt).

1:   for each entry $\in$ *FlowTable* do
2:      if *entry.inPort* = *brkPrt* then
3:         *entry.action* $\leftarrow$ *drop*
4:         *FlowDict[entry.inPort].append(entry.flowDef)*
5:      end if
6:   end for
7:   for each *key* $\in$ *FlowTable.keys()* do
8:      *msg.srcAddr* $\leftarrow$ *Self IP/MAC Addr*
9:      *msg.id* $\leftarrow$ *RandomNumber*
10:     *msg.flowDef* $\leftarrow$ *Predefined flow definition*
11:     *msg.flowCount* $\leftarrow$ *length(FlowDict[key])*
12:     *msg.flowList* $\leftarrow$ *FlowDict[key]*
13:     *SendMsg* $\leftarrow$ *(key,msg)*
14: end for

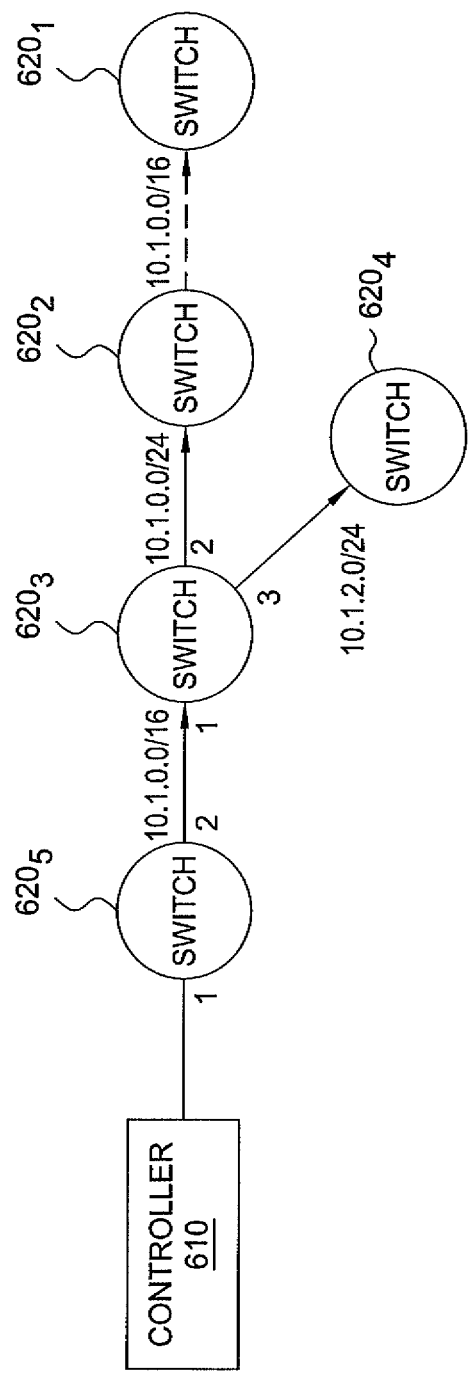

Algorithm 2 Algorithm for a downstream switch receiving
*lfm* on *brkPrt*. *FlowDict* is a dictionary / hash table whose
keys are the ingress ports that bring in the flows going toward
*brkPrt*, and the values are the lists including the definition of
these flows. *SendMsg(prt, msg)* is a function that sends out a
new flow table entry whose flow definition is *flow*, and action
is drop packet. The original flow table entry remains intact.

1:  for each entry ∈ *FlowTable* do
2:   if *entry.inPort* = *brkPrt* then
3:    *prt* ← *entry.inPort*
4:    for each *flow* ∈ *lfm.flowList* do
5:     if *flow* ⊇ *entry.flowDef* then
6:      *entry.action* ← *drop*
7:      *FlowDict[prt].append(entry.flowDef)*
8:     else if *flow* ⊂ *entry.flowDef* then
9:      *splitEntry(flow)*
10:     *FlowDict[prt].append(floe)*
11:    end if
12:   end for
13:  end if
14: end for
15: for each *key* ∈ *FlowDict.keys()* do
16:  *msg.srcAddr* ← *Self IP/MAC Addr*
17:  *msg.id* ← *lfm.id*
18:  *msg.flowDef* ← *Predefined flow definition*
19:  *msg.flowCount* ← *length(Flow Dict[key])*
20:  *msg.flowList* ← *FlowDict[key]*
21:  *SendMsg(key,msg)*
22: end for

METHOD AND APPARATUS FOR COPING WITH LINK FAILURES IN CENTRAL CONTROL PLANE ARCHITECTURES

FIELD OF THE INVENTION

The invention relates generally to communication networks and, more specifically but not exclusively, to coping with link failures in central control plane architectures.

BACKGROUND

Recently, network operators have been deploying central control plane architectures in which traffic switching/routing functions and control of the traffic switching/functions are separated into different planes having different types of nodes, namely, a control plane including one or more control nodes and a data plane including one or more data switching/routing nodes. In such central control plane architectures, control plane functions of the control plane may be implemented using general-purpose servers, such that the switches and/or routers of the data plane may only require limited intelligence. For example, two such central control plane architectures that have been proposed include the SoftRouter architecture and the 4D architecture. While such architectures provide various benefits, link failures in such architectures may result in a number of problems. For example, a link failure may cause one or more switches to lose contact with the controller, may result in routing loops between switches, and the like. These scenarios resulting from link failures may cause loss of traffic, generate a large amount of unnecessary traffic in the network, and cause other types of problems. Disadvantageously, however, existing central control plane architectures assume that the controller is always reliable and that the probability of link failures is zero and, therefore, do not address the potential problem of link failures in control plane architectures.

SUMMARY

Various deficiencies in the prior art are addressed by embodiments for coping with link failures in central control plane architectures.

In one embodiment, a method for reporting a failure of a link associated with a node includes detecting a failure of a link associated with the node, identifying an interface of the node associated with the failed link, identifying, from a flow table of the node, an ingress interface of the node via which a flow intended for the failed link is received, generating a link failure message for the identified ingress interface, and sending the link failure message via the identified ingress interface.

In one embodiment, a method for use at a local node having a flow table includes receiving a link failure message indicative of a link failure detected at a remote node where the link failure message includes a flow definition of a flow received at the remote node from the local node, identifying an interface of the local node via which the link failure message is received, identifying from the flow table of the local node an ingress interface of the local node via which a flow intended for the failed link is received, generating a new link failure message for the identified ingress interface of the node, and sending the new link failure message via the identified ingress interface of the local node.

BRIEF DESCRIPTION OF THE DRAWINGS

The teachings herein can be readily understood by considering the following detailed description in conjunction with the accompanying drawings, in which:

FIG. 5 depicts an exemplary pseudo-code representation of processing performed by a switch in response to detecting a link failure;

FIG. 6 depicts an exemplary central control plane architecture for illustrating processing by a switch in response to receiving an LFM;

FIG. 8 depicts an exemplary pseudo-code representation of processing performed by a switch in response to receiving an LFM indicative of a link failure;

To facilitate understanding, identical reference numerals have been used, where possible, to designate identical elements that are common to the figures.

DETAILED DESCRIPTION OF THE INVENTION

A failed link reporting capability is depicted and described herein, for coping with link failures in central control plane architectures. The failed link reporting capability provides mechanisms for coping with link failures, including enabling targeted reporting of link failures within the network a manner tending to prevent flooding of link failure messages (LFMs) within the network and enabling configuration of switches within the network in a manner tending to prevent transmission of flows toward failed links of the network. The failed link reporting capability is configured such that the relevant switches are notified of a link failure, thereby enabling configuration of the relevant switches to refrain from sending messages in the direction of the failed link. The failed link reporting capability ensures that all relevant switches are notified of the failed link significantly sooner than the associated controller identifies the failed link and provides an associated update for informing the switches. The failed link reporting capability reduces wasteful traffic in the network in the case of a failure of a controller. The failed link reporting capability provides mechanisms for coping with link failures in central control plane architectures while still maintaining a reduced level of intelligence on the switches.

Although the failed link reporting capability is primarily depicted and described herein within the context of a central control plane architecture for switches in which the switching functions are performed by switching nodes which are controlled by one or more controllers of a control plane, it will be appreciated that the failed link reporting capability may be used in other types of central control plane architectures in which there may be a possibility of failures of links.

Figure 1:
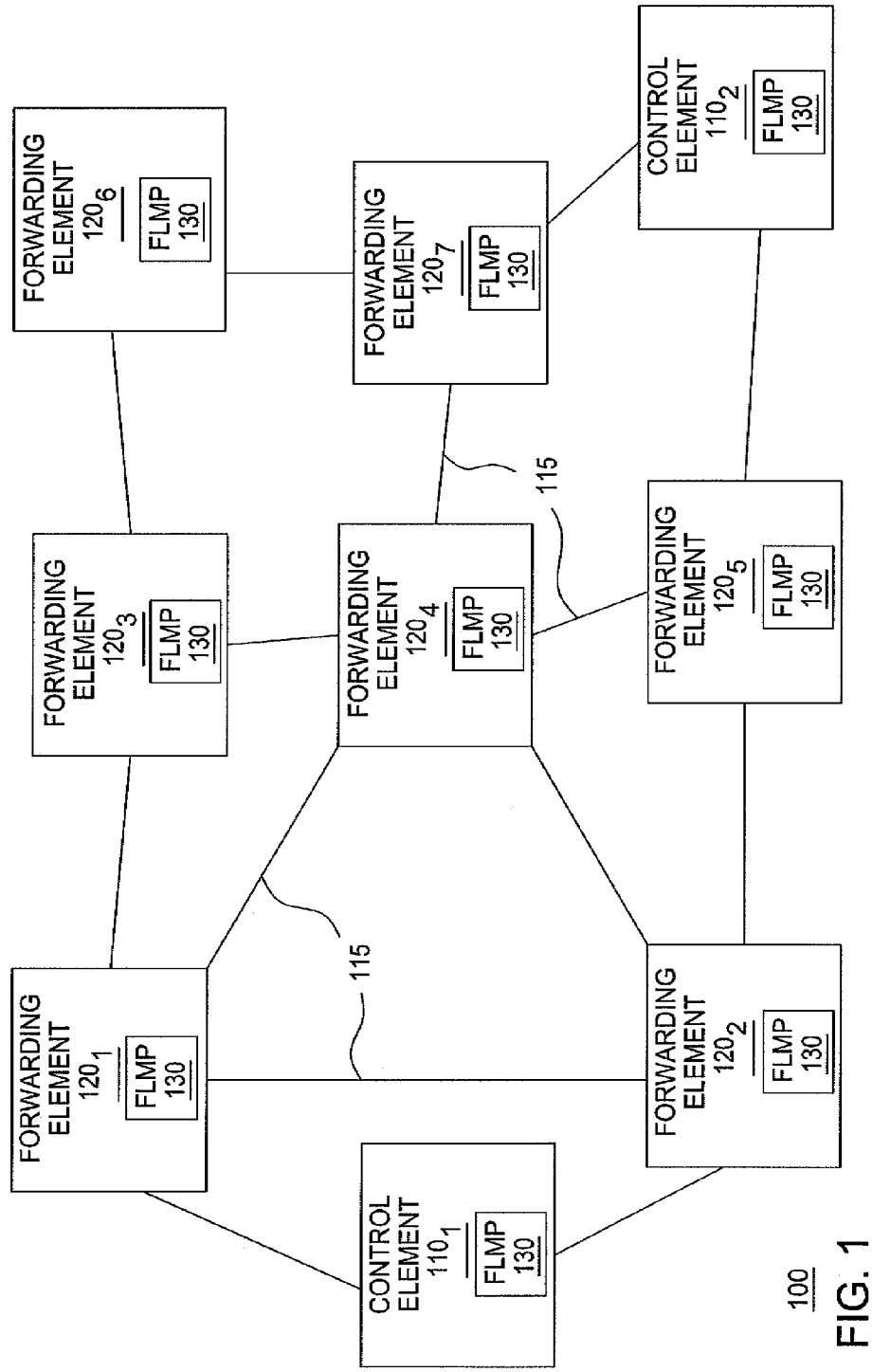
FIG. 1 depicts a high-level block diagram of an exemplary central control plane architecture.

FIG. 1 depicts a high-level block diagram of an exemplary central control plane architecture.

As depicted in FIG. 1, exemplary central control plane architecture 100 includes a pair of control elements (CEs) $110_1$-$110_2$ (collectively, CEs 110) and a plurality of forwarding elements (FEs) $120_1$-$120_7$ (collectively, FEs 120). The CEs 110 and FEs 120 form a network, communicating using communication links 115.

The CEs 110 each are configured to configure and control the FEs 120. For example, CEs 110 may provide packet routing information to the FEs 120 for use by the FEs 120 in forwarding packets. The associations between CEs 110 and FEs 120 may be implemented in any suitable manner. In one embodiment, the CEs 110 cooperate to manage the FEs 120. In one embodiment, the CEs 110 are responsible for managing different sets of FEs 110 (e.g., CE $110_1$ manages FEs $120_1$-$120_4$ and CE $120_2$ manages FEs $120_5$-$120_7$). In such embodiments, the association(s) between CEs 110 and FEs 120 may be static and/or dynamic. The CEs 110 may communicate with the FEs 120 in any suitable manner (e.g., using any suitable protocol(s)).

The FEs 120 each are configured for forwarding packets. The FEs 120 may forward packets in any suitable manner. In one embodiment, for example, each FE 120 maintains a respective flow table having flow table entries associated with packet flows, where each flow table includes one or more fields defining the flows and an Action field specifying handling of packets of the packet flows, respectively. In one embodiment, the flow tables of the FEs 120 are adapted to include an additional field (namely, an ingress interface field) for use by the FEs 120 in providing various functions of the failed link reporting capability, as depicted and described herein. The adapting of flow tables of FEs 120 in this manner is depicted and described in detail with respect to FIG. 2. The FEs 120 may communicate, for exchanging packets, in any suitable manner (e.g., using any suitable protocol(s).

In general, the exemplary central control plane architecture 100 may represent deconstruction of routers/switches by separating implementation of control plane functions from packet forwarding functions, such that control plane functions are implemented on control elements (illustratively, CEs 110) that are separate from forwarding elements (illustratively, FEs 120) which perform packet forwarding functions. The exemplary central control plane architecture 100 may be better understood by considering exemplary implementations of the exemplary central control plane architecture 100 which are provided using the SoftRouter architecture and the 4D architecture, a discussion of which follows.

In one embodiment, for example, exemplary central control plane architecture 100 may be implemented as a SoftRouter architecture. While in existing networks the control functions and packet forwarding functions of routers are tightly intertwined (such that deploying and maintaining a large network is complex and expensive), the SoftRouter architecture separates router control functions from router packet forwarding functions, thereby achieving reductions in complexity and cost. In the SoftRouter architecture, elements of the network may be classified as Forwarding Elements (FEs), Control Elements (CEs), and Network Elements (NEs). FEs are switches that perform packet forwarding and switching functions, and have a minimum amount of control functions implemented thereon (e.g., FEs 120 of central control plane architecture 100 of FIG. 1). CEs are general purpose servers that are connected to multiple FEs and configured to run the control plane functions on behalf of the FEs to which they are connected (e.g., CEs 110 of central control plane architecture 100 of FIG. 1). A NE is a logical grouping of one or more CEs controlling multiple FEs. By separating control and packet forwarding functions, the SoftRouter architecture increases network reliability. Namely, an IP router could have hundreds of thousands of lines of code, and with such a large amount of software running on every router in the network, the probability of the control plane functions making a mistake is very high; however, when control functions are governed by a centralized authority (e.g., a CE), and the packet forwarding functions are implemented on switches having little software (e.g., FEs), the probability of a control plane error is greatly reduced. Furthermore, in addition to simplicity and increased reliability, the SoftRouter architecture also provides various other beneficial features, such as network scalability, control plane security, ease of introducing new functionality, and the like, as well as various combinations thereof. The SoftRouter architecture may be better understood by way of reference to (1) the paper entitled "Separating Control Software from Routers," by Ramachandran Ramjee, Furquan Ansari, Martin Havemann, T. V. Lakshman, Thyagarajan Nandagopal, Krishan K. Sabnani, and Thomas Y. C., published in IEEE COMSWARE, 2006 and (2) the paper entitled "The SoftRouter Architecture," by T V Lakshman, T Nandagopal, R Ramjee, K Sabnani, and T Woo, published in HotNets-III, 2004, both of which are incorporated by reference herein in their entireties.

In one embodiment, exemplary central control plane architecture 100 may be implemented as 4D architecture. In the 4D architecture, the network is split into four logical planes, including a Decision Plane, a Dissemination Plane, a Discovery Plane, and a Data Plane. The Decision Plane, which makes the decisions regarding network control, includes multiple servers referred to as decision elements. The Dissemination Plane is responsible for efficient communication between the decision elements and network switches, and maintains separate paths for control information and regular data packets. The Dissemination Plane is more of a logical entity and may or may not be comprised of any physical element. The Discovery Plane is responsible for identifying physical components of the network, such as the network switches. The Discovery Plane also is a logical plane. The Data Plane is controlled by the Decision Plane, and is primarily responsible for handling individual packets. The 4D architecture, like the SoftRouter architecture, provides various benefits, such as robustness, increased security, more heterogeneity, a separate networking logic, and the like. The 4D architecture may be better understood by way of reference to the paper entitled "A Clean Slate 4D Approach to Network Control and Management," by A Greenberg, G Hjalmtysson, D A Maltz, A Myers, J Rexford, G Xie, H Yan, J Zhan, and H Zhang, published in SIGCOMM CCR, 2005, which is incorporated by reference herein in its entirety.

The SoftRouter architecture and the 4D architecture each maintain a control plane that is separate from the data plane, where packet forwarding elements of the data plane are controlled remotely by control elements of the data plane, and where the control elements may be multiple hops from the packet forwarding elements.

In one embodiment, the exemplary central control plane architecture 100 may be implemented using the OpenFlow Switching Protocol, a communications protocol that provides a controller access to the data path of a router or switch via a network, thereby enabling high level control software of the router or switch to run on a standard server instead of running on the CPU inside of the router or switch. It will be appreciated that any other suitable communications protocol(s) may be used to implement exemplary control plane architecture 100.

As described herein, link failures are quite common in communication networks. Based on the topologies and flow structures of different networks, a failed link may have different implications for different networks. For example, link failures may result in forwarding of packets which eventually will be dropped due to failed links, formation of islands including forwarding elements that are unable to communicate with their respective controller(s), formation of routing loops, and the like, as well as various other types of problems which may result from link failures. The failed link reporting capability depicted and described herein can prevent many such problems, or at least significantly reduce the impact of such problems.

As described herein, each of the elements of exemplary central control plane architecture 100 is configured to support the failed link reporting capability. For example, as depicted in FIG. 1, each of the CEs 110 and FEs 120 of exemplary central control plane architecture 100 includes a respective failed link processing module (FLPM) 130 configured for providing various functions of the failed link reporting capability depicted and described herein.

In general, various embodiments of the failed link reporting capability provide functions such that, in case of a link failure, (1) all of the switches that could send flows in the direction of the failed link are informed of the link failure, (2) link failure messages are not propagated in the network indefinitely and, unless required, are not flooded in the network, and (3) a suitable amount of information, regarding the flows that are affected by the failed link, is provided to the switches that could send flows in the direction of the failed link, for enabling configuration of those switches to modify handling of affected flows (while also ensuring that flows that are not affected by the failed link are not modified). The various embodiments of the failed link reporting capability provide such functions while ensuring that a minimum amount of intelligence is implemented on the switches.

In general, the failed link reporting capability enables a switch that identifies a link failure to notify one or more switches affected by the link failure to not send any flows that are supposed to be routed via the failed link, while also preventing flooding of link failure notifications to other switches. In this manner, when a link fails in the network, the failed link reporting capability of the switch that detects the failed link informs each of the relevant switches (e.g., those that could send flows in the direction of the failed link) of the failed link. The link failure information may be exchanged in any suitable manner, e.g., using one or more Link Failure Messages (LFMs). In exchanging link failure information, however, the failed link reporting capability also operates in a manner tending to prevent flooding of the link failure information within the network. In order to provide such features of the failed link reporting capability, a switch supporting the failed link reporting capability needs knowledge of the origin of a flow. While the switches in a central control plane architecture do not have knowledge of the global topology of the network (as the switches operate under control of network controller(s)), the switches in a central control plane architecture can identify the origin of a flow from a flow table entry.

As will be understood, flows within a network may be defined in many different ways, e.g., such as by using any one or more header fields of the packet headers used to route packets within the network. For example, if a flow is defined using the source and destination IP addresses, a switch could easily derive the origin of the flow and send a link failure message in that direction; however, in many cases this information may not be very useful, as may be better understood by considering the exemplary network of FIG. 2.

Figure 2:
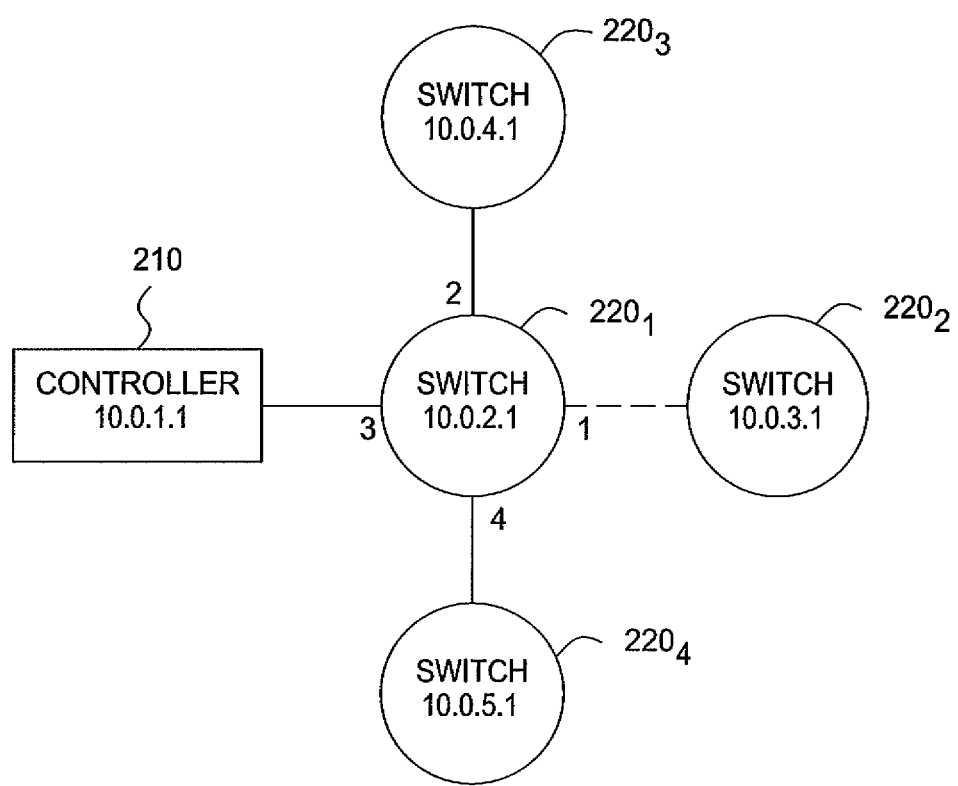
FIG. 2 depicts a high-level block diagram of an exemplary central control plane architecture.

FIG. 2 depicts a high-level block diagram of an exemplary central control plane architecture. As depicted in FIG. 2, the exemplary central control plane architecture 200 includes a controller 210 and four switches $220_1$-$220_4$ (collectively, switches 220). The controller 210 is coupled to switch $220_1$, which is in turn coupled to switches $220_2$, $220_3$, and $220_4$. The switch $220_1$ is coupled to controller 210, switch $220_2$, switch $220_3$, and switch $220_4$ via communication links which terminate on switch $220_1$ at respective interfaces of switch $220_1$ as follows; controller 210 (Interface#3), switch $220_2$ (Interface#1), switch $220_3$ (Interface#2), and switch $220_4$ (Interface#4). The IP addresses of controller 210 and switches $220_1$-$220_4$ are 10.0.1.1, 10.0.2.1, 10.0.3.1, 10.0.4.1, and 10.0.5.1, respectively. In exemplary central control plane architecture 200, assume that flows are defined according to the source and destination IP addresses of the flows, and further assume that the flow table maintained by switch $220_1$ is as follows:

TABLE 1

| Source IP Address | Destination IP Address | Action |
|---|---|---|
| 10.0.5.0/24 | 10.0.3.0/24 | forward to Interface#1 |
| 10.0.3.0/24 | 10.0.4.0/24 | forward to Interface#2 |

In this configuration, if the link between switches $220_1$ and $220_2$ fails, $220_1$ could search its flow table and determine that all the flows that are sent to Interface#1 are coming from IP addresses 10.0.5.0/24. Disadvantageously, however, the flow table of switch $220_1$ does not specify which output port should be used to send link failure messages to the switches with IP addresses 10.0.5.0/24. As a result, specifying the source IP address is not necessarily useful. Furthermore, even if there may be cases in which specifying the MAC address of the source may be helpful in identifying the origin of the flow, it still may not be useful for use in forwarding link failure messages.

In one embodiment, in order to facilitate the failed link reporting capability, flow definitions of flows are adapted to include the ingress interfaces (e.g., ingress ports) of the flows, which may be used in addition to one or more other fields which may be used to define the flows. The ingress interface of a flow on a switch is the interface of the switch via which packets of the flow enter the switch. The inclusion of the ingress interface of a flow in defining the flow on a target switch enables propagation of link failure messages from the target switch to the switch from which the flow is received. In this manner, by configuring each switch in the network to use ingress interface information in the flow definition, link failure messages may be delivered to every switch that could possibly send flows in the direction of a failed link. In this embodiment, information may be included within a link failure message for enabling the switch that receives the link failure message to determine which flow or flows need to be prevented from being sent out by the switch receiving the link failure message.

Returning to exemplary central control plane architecture 200, assume that flows are defined according to the ingress port and destination IP address of the flows, such that the flow table maintained by switch $220_1$ is as follows:

TABLE 2

| Ingress Port | Destination IP Address | Action |
| --- | --- | --- |
| 4 | 10.0.3.0/24 | forward to Interface#1 |
| 1 | 10.0.4.0/24 | forward to Interface#2 |

In this configuration, if the link between switches $220_1$ and $220_2$ fails, $220_1$ could search its flow table and determine that all the flows that are sent to Interface#1 (i.e., flows sent toward the failed link) are coming from the Interface#4. The switch $220_1$ then generates an LFM and sends the LFM via Interface#4. The LFM includes information adapted for use by the switch that receives the LFM to identify flows which may be routed toward the failed link. The switch $220_4$ receives the LFM from switch $220_1$ and, upon receiving the LFM, identifies and stops flows that may be routed toward the failed link (i.e., stops sending packets of the identified flows toward switch $220_1$).

In this manner, a switch experiencing a link failure generates an LFM and sends the LFM to one or more other switches based on inclusion of ingress interfaces in flow definitions, where the LFM includes flow identification information adapted for use by each of the one or more other switches for identifying flows which may be routed toward the failed link associated with the LFM and modifying the identified flows which may be routed toward the failed link associated with the LFM. The various embodiments of functions performed by a switch that experiences a link failure may be better understood by way of reference to FIGS. 3-5. The various embodiments of functions performed by a switch that receives an LFM may be better understood by way of reference to FIGS. 6-8.

Switch Experiencing Link Failure

In one embodiment, a switch generates one or more LFMs in response to detecting failure of a link associated with the switch. The switch, upon detecting failure of a link associated with the switch, identifies an interface of the node associated with the failed link (denoted herein as brokenInterface). The switch then identifies, from its flow table, each ingress interface of the switch via which a flow intended for the failed link (i.e., a flow which may possibly be sent to brokenInterface) may be received. The switch then generates an LFM for each of the identified ingress interfaces, and sends the LFMs via the identified ingress interfaces for which the LFMs are generated (denoted herein as txInterfaces). In this manner, LFMs are distributed, in a targeted manner, only to those switches from which flows intended for the failed link may possibly be received, thereby reducing the amount of traffic exchanged for handling the link failure (e.g., preventing flooding of LFMs within the network where only a subset of the switches may originate flows intended for the failed link).

The LFM may include any suitable information. In one embodiment, the LFM includes a Source Address, a Message Identifier, a Flow Definition, and a Flow Count. In one embodiment, an LFM that is sent via an identified ingress interface (i.e., a txInterface) also includes, for each flow that is (1) received via the identified ingress interface via which the LFM is sent (i.e., received via the txInterface) and (2) transmitted via the interface of the node associated with the failed link (i.e., transmitted via the brokenInterface), a flow definition of the flow (denoted herein as Flow. In this manner, the switch that receives the LFM is informed of the flow definitions of each of the flows which should be blocked by the switch that receives the LFM. An exemplary LFM is depicted in Table 3, which follows:

TABLE 3

| Source Address | Message ID | Flow Definition | Flow Count | Flow Def. #1 | ... | Flow Def. #N |
| --- | --- | --- | --- | --- | --- | --- |

The Source Address field includes the address of the switch that generates and sends the LFM. The address may be any suitable type of address, which may depend on the type of network. In one embodiment, the Source Address is the IP address of the switch. In one embodiment, if the network supports MAC level routing (e.g., instead of IP routing), the Source Address may be the MAC address of the switch. The switch receiving the LFM uses the Source Address field to identify the source of the received LFM.

The Message Identifier (ID) field includes an identifier of the LFM. The Message ID field is used to ensure that the same LFM does not get forwarded multiple times by the same switch. For example, if routes in a network are not configured correctly, the same LFM could be received at the same switch multiple times. The switch that initiates the LFM may set the Message ID in any suitable manner (e.g., using an algorithm, randomly, and the like). The value of the Message ID field of the LFM does not change as the LFM is forwarded. When a switch receives a first LFM, the switch stores the LFM. When the switch receives a second LFM, the switch compares the value of the Message ID of the second LFM with the value of the Message identifier of the stored first LFM. If the values are different, the switch accepts and processes the second LFM. If a switch receives two LFMs with the same Message ID within a threshold length of time, the switch disregards the second LFM. A stored LFM may be discarded by the switch in response to any suitable trigger condition (e.g., after receiving an update from the controller, after expiration of a predefined time interval, and the like). In this manner, switches are prevented from propagating the same LFM multiple times.

The Flow Definition field includes a list of header fields which define a flow. The header field(s) defining a flow may be represented in any suitable manner (e.g., using the names of the header fields, using numerical values which represent the header fields, and the like). In one embodiment, in which numerical values are used to represent header fields, each of the switches is configured to recognize the mapping of the header fields to the values which are used to represent the header fields. The use of numerical values to represent header fields may enable a significant reduction in the size of the LFM. The Flow Definition field indicates which information (i.e., which header field or fields) is used to define a flow and, thus, which information is included within each of the Flow Def. #1-Flow Def. #N fields of the LFM. For example, where each of the Flow Def. #1-Flow Def. #N fields of the LFM identifies a flow that is defined based on ingress port and destination IP address, the Flow Definition field indicates that a combination of the Ingress Port field and the Destination IP Address field is used to define each of the flows reported by the LFM.

The Flow Count field indicates the total number of flow definitions that are specified as part of the LFM (namely, the number N of Flow Def. fields included within the LFM).

The Flow Def. #1-Flow Def. #N field(s) include the flow definitions for the flows that are (1) received via the identified ingress interface via which the LFM is sent (i.e., received via the txInterface) and (2) transmitted via the interface of the node associated with the failed link (i.e., transmitted via the brokenInterface). For each Flow Def. field, the flow definition is specified in terms of the values of the Flow Definition parameters specified in the Flow Definition field. The number of Flow Def. fields N is equal to the value specified in the Flow Count field. For example, where the where the Flow Definition field indicates that the flow definition parameters include the source and destination IP addresses, and Flow Count field has a value of 3, the LFM will include three sets of source/destination IP addresses in three Flow Def. fields (e.g., Flow Def. #1-Flow Def. #3).

Although primarily depicted and described with respect to specific types and arrangements of fields, it will be appreciated that the LFM may include any other suitable type(s) and/or arrangement(s) of fields.

The switch that generates and sends the LFM also modifies its flow table in response to detection of the failed link. The switch modifies the Action field of each entry of its flow table that is associated with a flow that is (1) received via the ingress interface via which the LFM is sent and (2) transmitted via the interface of the node associated with the failed link (i.e., each entry of the flow table having a flow definition that is included within the LFM as a Flow Def. field). The Action field of a flow table entry may be modified to include any suitable action. In one embodiment, for example, the Action field of a flow table entry is modified to indicate that packets for this flow should be dropped when received at the node. In one embodiment, for example, the Action field of a flow table entry is modified to indicate that packets for this flow should be forwarded toward a controller configured for controlling the node (e.g., where the network is configured to support this action and the controller is not interrupted due to the failed link). It will be appreciated that other suitable actions may be defined and used.

Figure 3:
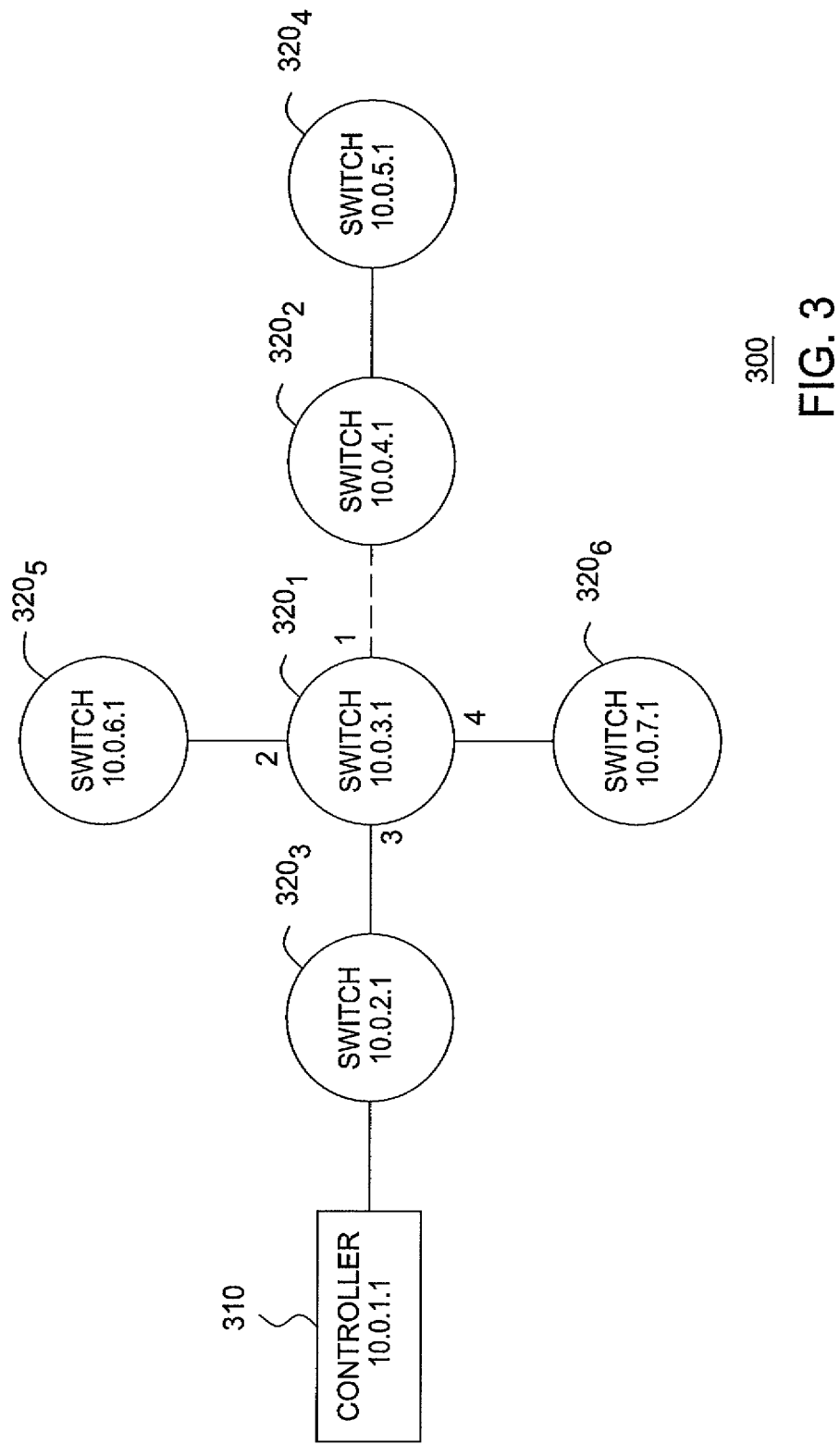
FIG. 3 depicts an exemplary central control plane architecture for illustrating processing by a switch in response to detecting a link failure.

The operation of a switch that detects a link failure may be better understood by way of reference to the exemplary network of FIG. 3.

FIG. 3 depicts an exemplary central control plane architecture for illustrating processing by a switch in response to detecting a link failure.

As depicted in FIG. 3, the exemplary central control plane architecture 300 includes a controller 310 and six switches $320_1$-$320_6$ (collectively, switches 320), which are arranged as follows: (1) controller 310 is coupled to switch $320_3$, (2) switch $320_3$ is coupled to switch $320_1$, (3) switch $320_1$ is coupled to switches $320_2$, $320_3$, $320_5$, and $320_6$, (4) and switch $320_2$ is coupled to switch $320_4$. The switch $320_1$ is coupled to switches $320_2$, $320_3$, $320_5$, and $320_6$ via communication links which terminate on switch $320_1$ at respective interfaces of switch $320_1$ as follows: switch $320_2$ (Interface#1), switch $320_3$ (Interface#3), switch $320_5$ (Interface#2), and switch $320_6$ (Interface#4). The IP addresses of controller 310 and switches $320_1$-$320_6$ are 10.0.1.1, 10.0.3.1, 10.0.4.1, 10.0.2.1, 10.0.5.1, 10.0.6.1, and 10.0.7.1, respectively. In the exemplary central control plane architecture 300, assume that flows are defined according to the ingress port and destination IP address of the flow, such that the flow table maintained by switch $320_1$ is as follows:

TABLE 4

| Ingress Port | Flow Definition (Destination IP Address) | Action |
|---|---|---|
| 2 | 10.0.7.0/24 | forward to Interface#4 |
| 3 | 10.0.4.0/24 | forward to Interface#1 |
| 3 | 10.0.5.0/24 | forward to Interface#1 |
| 4 | 10.0.6.0/24 | forward to Interface#2 |
| 4 | 10.0.4.0/24 | forward to Interface#1 |

In this configuration, when the link between switches $320_1$ and $320_2$ fails (which is associated with Interface#1 of switch $320_1$), switch $320_1$ searches its flow table and determines that it is receiving flows from Interface#3 and Interface#4 that will be sent out on Interface#1 (and, thus, via the failed link). As a result, switch $320_1$ generates two LFMs, one LFM for Interface#3 and one LFM for Interface#4. It will be appreciated that, even though switch $320_1$ is receiving a flow from Interface#2, this flow is not sent out via Interface#1 and, thus, is not impacted by the failed link.

In this example, since there are two flows that enter switch $320_1$ via Interface#3 and exit switch $320_1$ via Interface#1, the LFM generated for and sent via Interface #3 includes two flow definitions (Flow Def. fields) as follows: 10.0.4.0/24 and 10.0.5.0/24. For example, the LFM generated for and sent via Interface #3 may include the following fields and associated values: Source Address (10.0.3.1), Message ID (1234), Flow Definition (destination IP address) Flow Count (2), Flow Def. #1 (10.0.4.0/24), Flow Def. #2 (10.0.5.0/24).

Similarly, in this example, since there is only one flow that enters switch $320_1$ via Interface#4 and exits switch $320_1$ via Interface#1, the LFM generated for and sent via Interface #4 includes one flow definition (Flow Def. field) as follows: 10.0.4.0/24. For example, the LFM generated for and sent via Interface #4 may include the following fields and associated values: Source Address (10.0.3.1), Message ID (1235), Flow Definition (destination IP address) Flow Count (1), Flow Def. #1 (10.0.4.0/24).

It will be appreciated that, even though the ingress port is used to define a flow on the switch which detects the link failure, the ingress port information does not need to be included within LFMs generated and sent by the switch which detects the link failure (since ingress ports are switch specific and would not be useful to the switch(es) receiving the LFM(s)).

In this configuration, when the link between switches $320_1$ and $320_2$ fails (which is associated with Interface#1 of switch $320_1$), the switch $320_1$, in addition to generating and sending the LFMs, modifies its flow table. Namely, switch $320_1$ modifies the Action field of each entry of its flow table that is associated with a flow that is (1) received via the ingress interface via which the LFM is sent and (2) transmitted via the interface of the node associated with the failed link (i.e., those entries of the flow table having flow definitions that are attached to the LFMs as the Flow Def. fields). Here, the second, third, and fifth entries of the flow table of switch $320_1$ are modified (i.e., those that are both (1) associated with ingress ports 3 or 4 and (2) currently include an action indicating forwarding to Interface#1 associated with the failed link, as may be seen from Table 4). The Action fields of the flow table entries may be modified to include any suitable actions (e.g., drop packets, forward packets to the controller 310, and the like). Namely, the flow table maintained by switch $320_1$ is modified as follows:

TABLE 5

| Ingress Port | Flow Definition (Destination IP Address) | Action |
|---|---|---|
| 2 | 10.0.7.0/24 | forward to Interface#4 |
| 3 | 10.0.4.0/24 | drop/send to controller |
| 3 | 10.0.5.0/24 | drop/send to controller |
| 4 | 10.0.6.0/24 | forward to Interface#2 |
| 4 | 10.0.4.0/24 | drop/send to controller |

Figure 4:
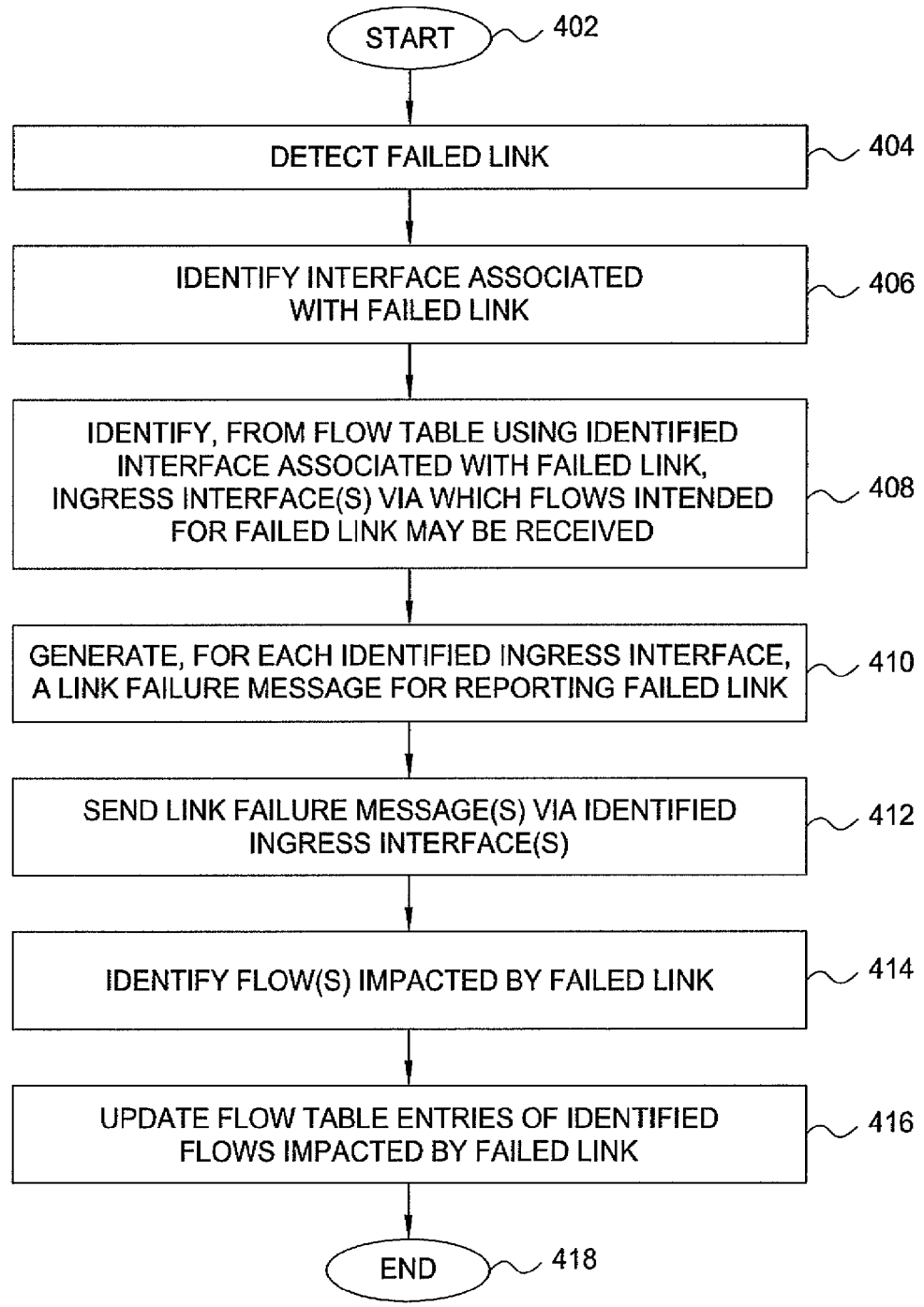
FIG. 4 depicts one embodiment of a method performed by a switch in response to detecting a link failure.

FIG. 4 depicts one embodiment of a method performed by a switch in response to detecting a link failure. The method 400 is executed by a switch having a flow table where flows are defined using ingress port.

At step 402, method 400 begins.

At step 404, a link failure is detected at the switch.

At step 406, an interface associated with the failed link is identified. The interface is an interface of the switch at which the link failure is detected.

At step 408, the ingress interface(s), via which a flow(s) intended for the failed link may be received, is identified. The ingress interface(s) is identified from the flow table of the switch based on the identified interface of the failed link.

At step 410, for each identified ingress interface, an LFM is generated for reporting the link failure to the switch associated with the other end of the link of the identified ingress interface.

At step 412, the generated LFM(s) is sent via the identified ingress interface(s).

At step 414, the flow(s) impacted by the link failure is identified. The flow(s) impacted by the link failure may be determined in any suitable manner (e.g., from the flow table, from the generated/sent LFM(s), and the like). The flow(s) impacted by the link failure include(s) each flow that is (1) received via one of the identified ingress interfaces via which an LFM is sent and (2) transmitted via the interface of the switch that is associated with the failed link.

At step 416, the flow table entry(s) of the identified flow(s) is updated. The flow table entry(s) may be updated in any suitable manner (e.g., by modifying the Action field to indicate that packets of the flow are to be dropped or forwarded to a controller).

At step 418, method 400 ends.

FIG. 5 depicts an exemplary pseudo-code representation of processing performed by a switch in response to detecting a link failure. As depicted in FIG. 5, the exemplary pseudo-code representation 500 is configured for use by a switch for enabling the switch to generate and transmit LFMs and update flow table entries in response to link failures. In exemplary pseudo-code representation 500, (1) brkPrt represents the port of the switch that is associated with the failed link, (2) FlowDict is a dictionary/hash table having keys which are the ingress ports of the switch that receive flows directed toward brkPrt and having values that are the lists including the definition of the flows, and (3) SendMsg(prt, msg) is a function that sends an LFM (msg) via a port (prt). In exemplary pseudo-code representation 500, the updating of the flow table entry in the switch is represented by line 3, the generation of the LFM is represented by lines 7-14 (where lines 8-12 represent population of the fields of the LFM and line 13 represents sending of the generated LFM). In one embodiment, in order to inform all relevant switches of the link failure as soon as possible, the exemplary pseudo-code representation 500 may be modified such that updating of the flow table entries is performed after each LFM has been generated and sent. It will be appreciated that various other modifications may be made. It will be appreciated that exemplary pseudo-code representation 500 merely represents one possible implementation of method 400 of FIG. 4 and, more generally, of the various functions of the failed link reporting capability and implementation of the failed link reporting capability on switches identifying link failures. Any other suitable implementation(s) may be used.

Switch Receiving LFM

In one embodiment, a switch generates one or more LFMs in response to receiving an LFM. The switch, upon receiving an LFM, identifies the interface of the switch via which the LFM is received (denoted herein as rxInterface). The switch then identifies, from its flow table, each ingress interface of the switch via which a flow associated with a flow definition of the received LFM may be received (i.e., a flow which matches a flow definition of the received LFM and which is sent to the rxInterface via which the LFM is received). The switch identifies the ingress interface(s) using each flow definition of the received LFM (Flow Def. #1-Flow Def. #N) by searching its flow table to identify ingress ports of the switch via which any flow(s) associated with the flow definition(s) are received. An ingress interface is identified, as being an ingress interface via which flows impacted by the failed link may be received, if it is listed in a flow table entry having (1) an Action field indicative that the flow is forwarded via the identified interface via which the LFM is received and (2) a Flow Definition field matching a flow definition (Flow Def. field) of the received LFM. The switch then generates a new LFM for each identified ingress interface(s), and sends the LFM(s) via the identified ingress interface(s) for which the new LFM(s) is generated (denoted herein as txInterface(s)). In this manner, LFMs are distributed, in a targeted manner, only to those switches from which flows intended for the failed link may possibly be received, thereby reducing the amount of traffic exchanged for handling the link failure (e.g., preventing flooding of LFMs within the network where only a subset of the switches may originate flows intended for the failed link).

The format of the new LFM may be identical to the format of the received LFM which triggers generation of the new LFM, or may use any other suitable format. In one embodiment, for example, the new LFM includes the Source Address, Message ID, Flow Definition, Flow Count, and Flow Def. fields. In one embodiment, the population of such fields in the new LFM is similar to the population of such fields in the received LFM, as described hereinabove.

In one embodiment, the value of the Message ID field of the new LFM is the same as the value of the Message ID field of the received LFM which triggers generation of the new LFM.

In one embodiment, each Flow Def. field of the new LFM is populated with the flow definition of the flow table entry of the flow table associated with that Flow Def. field of the new LFM, rather than being populated with the flow definition specified in the Flow Def. field of the received LFM. This is due to the fact that, in at least some cases, while there may be certain situations in which the flow definition of the flow table entry exactly matches the Flow Def. field of the received LFM, there also certain situations in which the flow definition of the flow table entry does not exactly match the Flow Def. field of the received LFM. This may be a reason why, in at least some embodiments, a new LFM is generated by the switch receiving the LFM, rather than the switch receiving the LFM just forwarding the received LFM as the new LFM. This may be better understood via reference to the exemplary central control plane architecture of FIG. 6.

The various fields of the new LFM may be populated in any suitable manner.

Although primarily depicted and described herein with respect to embodiments in which a new LFM generated by the switch in response to receiving an LFM (rather than forwarding the received LFM), in various other embodiments the received LFM is forwarded by the switch in response to receiving the LFM (rather than having the switch generate a new LFM). However, as noted above, there are certain situations in which forwarding of the existing LFM is insufficient, as may be better understood via reference to the exemplary central control plane architecture of FIG. 6.

The switch that receives the LFM, in addition to generating one or more LFMs, also modifies its flow table in response to receiving the LFM.

In general, the switch receiving the LFM modifies the Action field of each entry of its flow table that is associated with a flow that is (1) received via the ingress interface via which the LFM is sent and (2) transmitted via the interface of the node associated with the failed link (i.e., those entries of the flow table having flow definitions that are attached to the LFM as the Flow Def. fields).

In one embodiment, since a received LFM may include flow definitions (Flow Def. fields) that represent only a subset of the flows defined in the corresponding flow table entry, it may be necessary in some cases to split the entry of the flow table into two flow table entries before modifying the Action field. In cases in which a flow table entry is split into two entries, the two entries include (1) a first flow table entry corresponding to a first subset of flows of the split flow table entry (e.g., the subset of flows associated with the flow definition included within the received LFM) and (2) a second flow table entry corresponding to a second subset of flows of the split flow table entry (e.g., the subset of flows that are not associated with the flow definition included within the received LFM). In cases in which a flow table entry is split into two entries, only the Action field of the resulting split flow table entry that is associated with the flow definition that is attached to the LFM as the Flow Def. field is modified.

It will be appreciated that cases may arise in which flow table entries need to be merged or deleted in response to receiving an LFM (rather than split into multiple flow table entries in response to receiving an LFM). In one embodiment, such merging and deleting may be performed by a controller of the switch that receives the LFM, rather than the switch, since the switch does not possess global knowledge of the topology which may be required to perform such operations. In one embodiment, such merging and deleting may be performed by the switch that receives the LFM, rather than a controller of the switch that receives the LFM.

In such embodiments, the Action fields of the flow table entries may be modified to include any suitable actions (e.g., dropping packets of the flow, forwarding packets of the flow toward a controller, and the like), as described herein with respect to processing performed by a switch which detected a failed link.

FIG. 6 depicts an exemplary central control plane architecture for illustrating processing by a switch in response to receiving an LFM.

As depicted in FIG. 6, the exemplary central control plane architecture 600 includes a controller 610 and five switches $620_1$-$620_5$ (collectively, switches 620), which are arranged as follows: (1) controller 610 is coupled to switch $620_5$, (2) switch $620_5$ is coupled to switch $620_3$, (3) switch $620_3$ is coupled to switches $620_2$ and $620_4$, (4) and switch $620_2$ is coupled to switch $620_1$. The switch $620_5$ is coupled to controller 610 and switch $620_3$ via communication links which terminate on switch $620_5$ at respective interfaces of switch $620_5$ as follows: controller 610 (Interface#1) and switch $620_3$ (Interface#2). The switch $620_3$ is coupled to switches $620_2$, $620_4$, and $620_5$ via communication links which terminate on switch $620_3$ at respective interfaces of switch $620_3$ as follows: switch $620_2$ (Interface#2), switch $620_4$ (Interface#3), and switch $620_5$ (Interface#1).

As depicted in FIG. 6, switch $620_2$ sends all of its 10.1.0.0/16 traffic to switch $620_1$. The switch $620_2$, when it detects failure of its link to switch $620_1$, generates and sends an LFM to switch $620_3$ which informs switch $620_3$ not to send any 10.1.0.0/16 to switch $620_2$. If switch $620_3$ forwards the same LFM to $620_5$, switch $620_5$ will simply stop sending all of its 10.1.0.0/16 traffic to switch $620_3$, even though switch $620_3$ is capable of accepting and forwarding part of the 10.1.0.0/16 traffic. Thus, rather than forwarding the LFM to switch $620_5$, switch $620_3$ determines that the LFM received from switch $620_2$ is received on interface#2 (rxInterface), and, further, determines that there is only one flow table entry of its flow table that forwards flows via Interface#2 and that the flow definition of the flow table entry matches the flow definition provided within the LFM received by switch $620_3$. As a result, switch $620_3$ generates a new LFM and sends the new LFM to the ingress port of the identified entry of the flow table (in this case, Interface#1). In this case, the flow definition that is included within the new LFM (as a single Flow Def. field) would be the flow definition that is available in the flow table entry (namely, 10.1.1.0./24), not the flow definition that is included within the received LFM. The new LFM is sent from switch $620_3$ to switch $620_5$, and switch $620_5$ learns from the new LFM that it should not send 10.1.1.0/24 traffic to switch $620_3$.

In this configuration, when the link between switches $620_1$ and $620_2$ fails, the switch $620_2$ sends an LFM to switch $620_3$, which in turn sends an LFM to switch $620_5$. The LFM received at switch $620_5$ from switch $620_3$ indicates that switch $620_5$ should refrain from sending 10.1.1.0/24 traffic toward switch $620_3$. The switch $620_5$, however, does not have a flow table entry that exactly matches the flow definition 10.1.1.0/24 included within the LFM received at switch $620_5$. Namely, the flow table maintained in switch $620_5$ prior to receiving the LFM is as follows:

TABLE 6

| Ingress Port | Flow Definition (Destination IP Address) | Action |
|---|---|---|
| 1 | 10.1.1.0/16 | forward to Interface#2 |

In this case, if switch $620_5$ modifies the Action field of the flow table entry 10.1.1.0/16, switch $620_5$ will not be able to send traffic to switch $620_3$, even though at least some of that traffic may be routed by switch $620_3$ to switch $620_4$ rather than to switch $620_2$ associated with the failed link. As a result, in this case, switch $620_5$ splits the flow table 10.1.1.0/16 into two flow table entries as follows:

TABLE 7

| Ingress Port | Flow Definition (Destination IP Address) | Action |
|---|---|---|
| 1 | 10.1.1.0/24 | drop/send to controller |
| 1 | 10.1.0.0/16 | forward to Interface#2 |

In this case, following updating of the flow table of switch $620_5$, if switch $620_5$ receives a packet intended for IP address 10.1.2.5, this packet will match the second flow table entry and, thus, will be forwarded via Interface#2.

On the other hand, following updating of the flow table of switch $620_5$, if switch $620_5$ receives a packet intended for IP address 10.1.1.5, this packet will match both the first and second flow table entries and, thus, will be dropped or sent to the controller. The first flow table entry is selected, even though the IP address matches both entries, due to configuration of switch $620_5$ such that when a packet matches multiple entries of the flow table, only the flow table entry with the highest priority will be considered.

Figure 7:
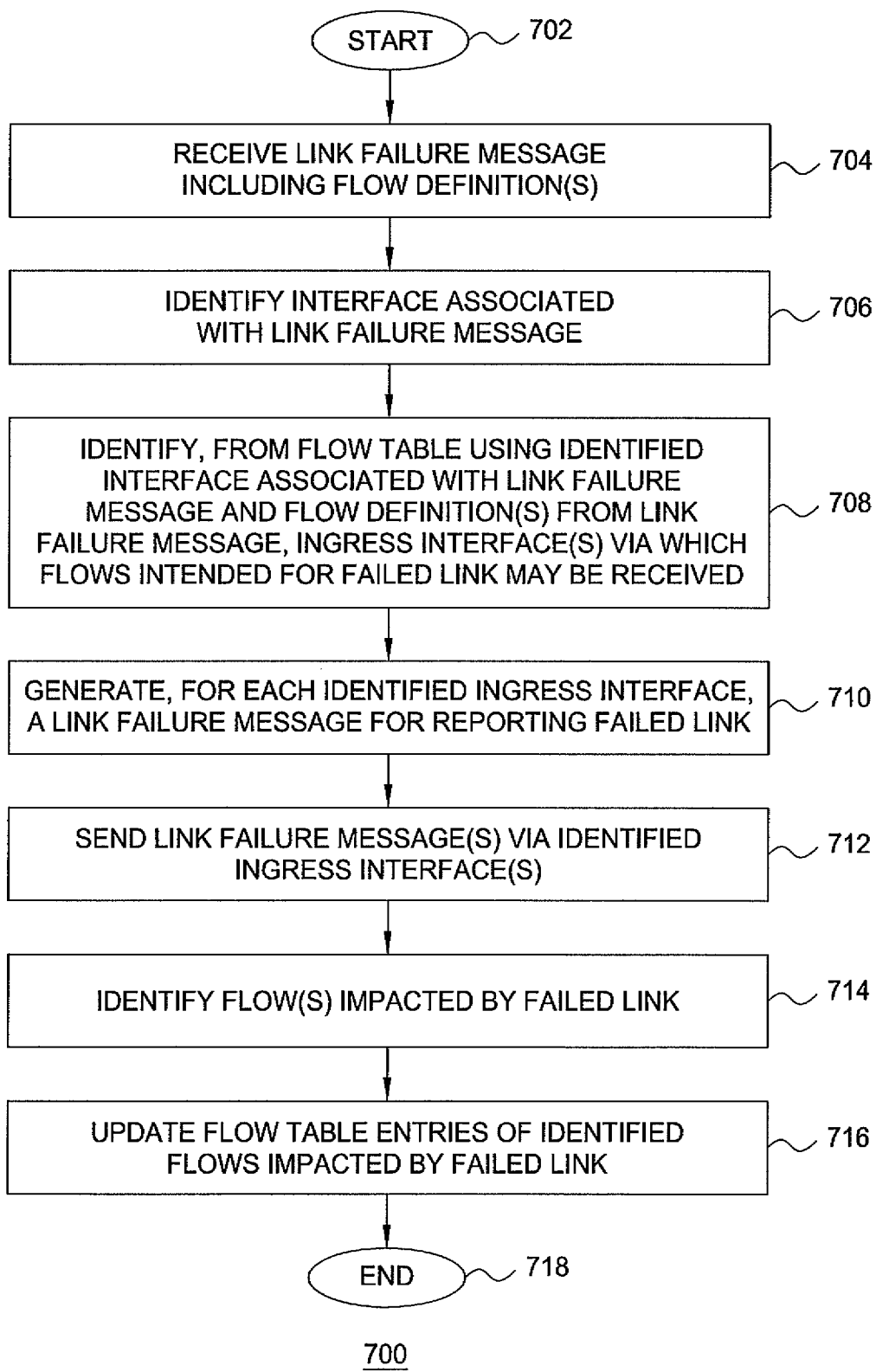
FIG. 7 depicts one embodiment of a method performed by a switch in response to receiving an LFM indicative of a link failure.

FIG. 7 depicts one embodiment of a method performed by a switch in response to receiving an LFM indicative of a link failure. The method 700 is executed by a switch having a flow table where flows are defined using ingress port.

At step 702, method 700 begins.

At step 704, an LFM is received. The LFM includes one or more flow definitions.

At step 706, an interface associated with the received LFM is identified. The interface is an interface of the switch at which the LFM is received.

At step 708, the ingress interface(s), via which flows impacted by the failed link may be received, is identified. The ingress interface(s) is identified, using the flow table of the switch, based on the identified interface associated with the LFM and the flow definition(s) of the LFM. An ingress interface is identified, as being an ingress interface via which flows impacted by the failed link may be received, if it is listed in a flow table entry having (1) an Action field indicative that the flow is forwarded via the identified interface via which the LFM is received and (2) a Flow Definition field matching a flow definition (Flow Def.) of the received LFM.

At step 710, for each identified ingress interface, an LFM is generated for reporting the link failure to the switch associated with the other end of the link of the identified ingress interface.

At step 712, the generated LFM(s) is sent via the identified ingress interface(s).

At step 714, the flow(s) impacted by the link failure is identified. The flow(s) impacted by the link failure may be determined in any suitable manner (e.g., from the flow table, from the generated/sent LFM(s), and the like). The flow(s) impacted by the link failure include(s) each flow that is (1) received via the ingress interface via which the generated link failure message is sent and (2) transmitted via the interface of the node via which the received LFM is received.

At step 716, the flow table entry(s) of the identified flow(s) is updated. The flow table entry(s) may be updated in any suitable manner (e.g., modifying a flow table entry, splitting a flow table entry into two flow table entries and modifying one of the two flow table entries, and the like, as well as various combinations thereof). The flow table entry(s) may be updated to include any suitable action(s) (e.g., dropping the packets, sending packets to a controller, and the like, as well as various combinations thereof).

At step 718, method 700 ends.

Although omitted for purposes of clarity, it will be appreciated that, upon receiving the LFM, the switch may determine whether the Message ID value of the received LFM matches any Message ID values of any previously received LFMs stored on the switch. As described herein, if a previously received LFM having the same Message ID is found, the received LFM is dropped and the remainder of the steps of method 700 are not performed for the received LFM, and if a previously received LFM having the same Message ID is not found, the received LFM is processed in accordance with method 700 as depicted and described herein.

FIG. 8 depicts an exemplary pseudo-code representation of processing performed by a switch in response to receiving an LFM indicative of a link failure. As depicted in FIG. 8, the exemplary pseudo-code representation 800 is configured for use by a switch for enabling the switch to generate and transmit LFMs and update flow table entries in response to receiving LFMs from other switches. In exemplary pseudo-code representation 800, (1) brkPrt represents the port of the switch via which the LFM is received, (2) FlowDict is a dictionary/hash table having keys which are the ingress ports of the switch that receive flows directed toward brkPrt and having values that are the lists including the definition of the flows, (3) SendMsg(prt, msg) is a function that sends an LFM (msg) via a port (prt), and (4) splitEntry (flow) creates a new flow table entry whose flow definition is flow and having an action of drop (the original flow table entry remains intact). In exemplary pseudo-code representation 800, the updating of the flow table entry in the switch is represented by lines 1-14, and generation of LFMs is represented by lines 15-22 (where lines 16-20 represent population of the fields of the LFM and line 21 represents sending of the generated LFM). In one embodiment, in order to inform all relevant switches of the link failure as soon as possible, the exemplary pseudo-code representation 800 may be modified such that updating of the flow table entries is performed after each LFM has been generated and sent. It will be appreciated that various other modifications may be made. It will be appreciated that exemplary pseudo-code representation 800 merely represents one possible implementation of method 700 of FIG. 7 and, more generally, of the various functions of the failed link reporting capability and implementation of the failed link reporting capability on switches receiving LFMs. Any other suitable implementation may be used.

The LFM forwarding procedure may continue until an LFM for a failed link reaches an end host. In this manner, since LFMs are forwarded only to the ingress ports of the switches which could potentially receive packets heading toward the failed link, the LFMs for a failed link will only reach the switches that could possibly send a flow or flows in the direction of the failed link. As a result, the LFMs are not sent to switches that have no use for the information regarding the link failure and, thus, only the relevant switches are informed about the link failure.

Other Considerations

Figure 9:
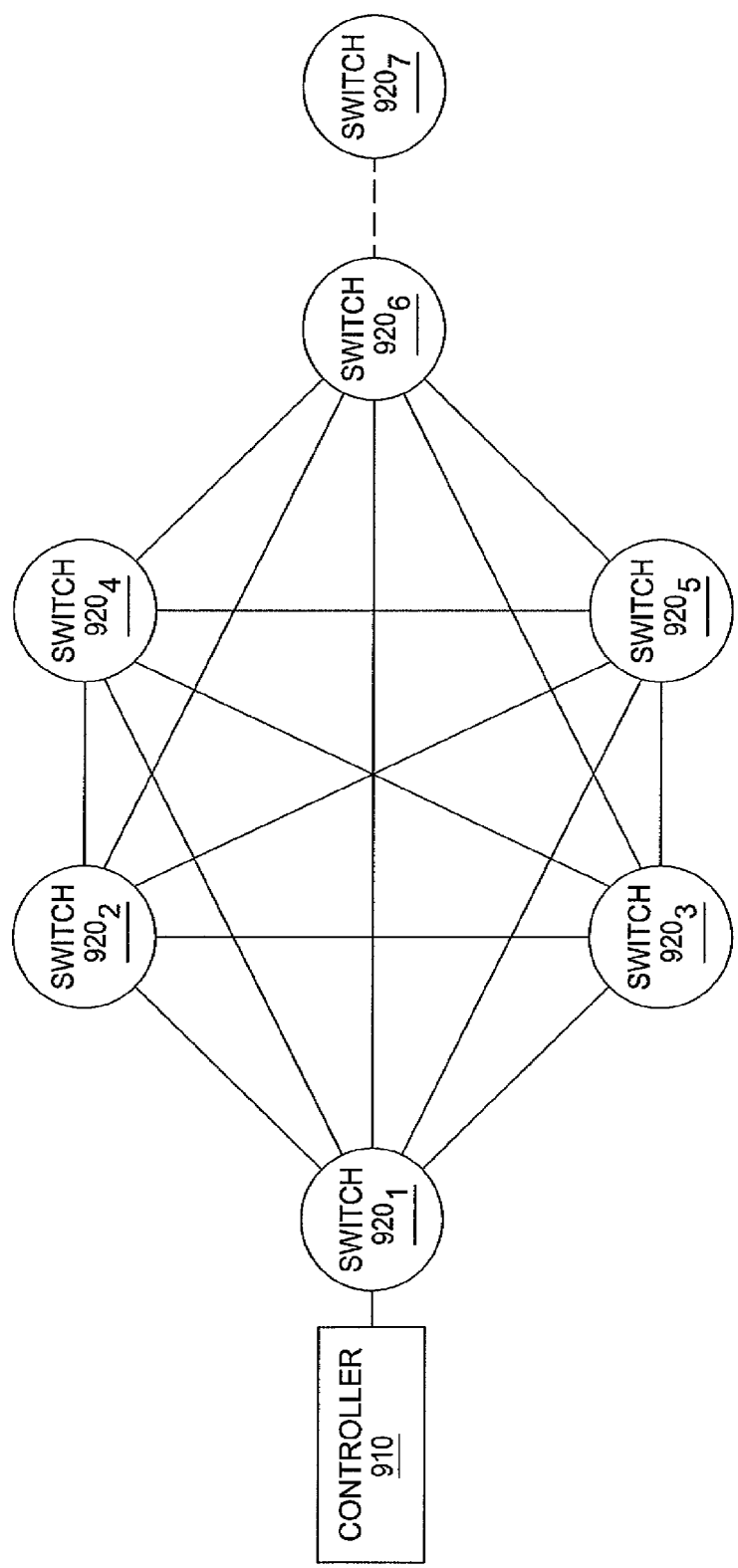
FIG. 9 depicts an exemplary central control plane architecture.
Figure 10:
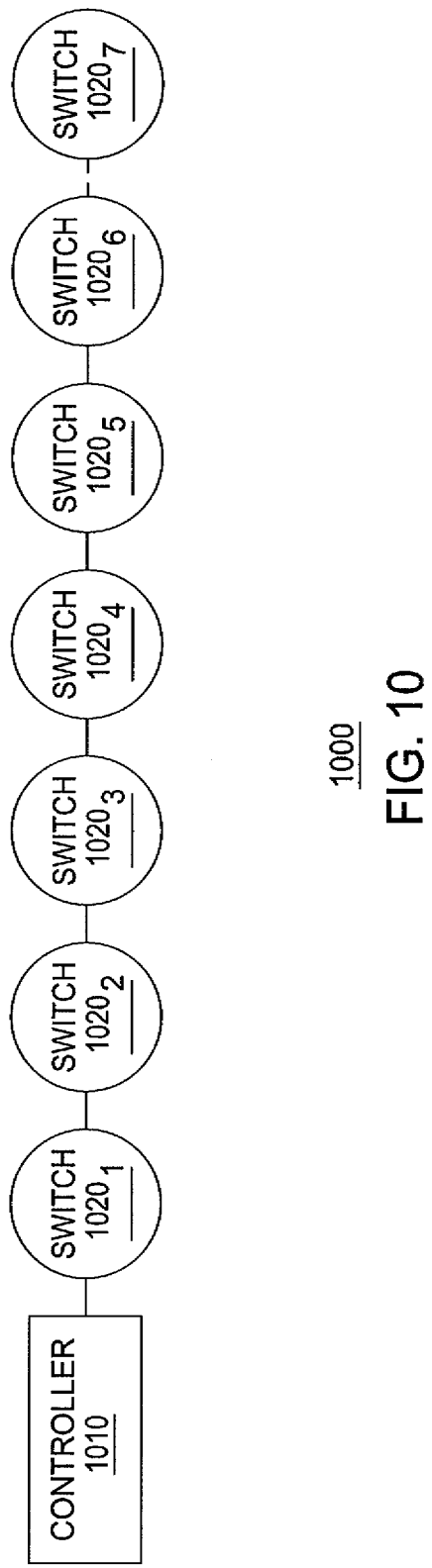
FIG. 10 depicts an exemplary central control plane architecture.

As described herein, inclusion of ingress port values in each flow definition of each switch of the network provides various advantages, however, inclusion of ingress port values in each flow definition of each switch of the network may be more advantageous for some network topologies (e.g., the topology of FIG. 9) than for other network topologies (e.g., the topology of FIG. 10).

FIG. 9 depicts an exemplary central control plane architecture. As depicted in FIG. 9, the exemplary central control plane architecture 900 includes a controller 910 and seven switches $920_1$-$920_7$ (collectively, switches 920). The controller 910 is coupled to switch $920_1$. The switches $920_1$-$920_6$ are connected in a full mesh topology. The switch $920_6$ is coupled to switch $920_7$. In exemplary central control plane architecture 900, assume that the flow tables of switches $920_1$ through $920_5$ each are configured such that switch $920_7$ is only two hops away from each of these switches (i.e., if switches $920_1$-$920_5$ have a flow that goes to switch $920_7$, this flow will directly go to switch $920_6$, and from switch $920_6$ the flow will be delivered to switch $920_7$).

In exemplary central control plane architecture 900, if the switches 920 do not have ingress ports specified within their flow table entries, the switches 920 will have to flood LFMs in the network in order to spread the news of a broken link. For example, when the link between the switches $920_6$ and $920_7$ fails, switch $920_6$ will generate a LFM and send the LFM via each of its five interfaces, and each of switches $920_1$ through $920_5$ will receive the LFMs and forward the LFMs to each of their other four interfaces (all interfaces except for the one connected to the switch $920_6$), respectively. As a result, in this configuration, 25 total LFMs need to be sent in order to spread the news of the failed link within exemplary central control plane architecture 900.

In exemplary central control plane architecture 900, if the switches 920 do have ingress ports specified within their flow table entries, the switches 920 will not have to flood LFMs in the network in order to spread the news of a broken link. For example, when the link between the switches $920_6$ and $920_7$ fails, switch $920_6$ will generate a LFM and send the LFM via each of its five interfaces; however, switch $920_1$ will not send LFMs to any of switches $920_2$-$920_6$ because switch $920_1$ knows that no packets destined for switch $920_7$ are going to be received at switch $920_1$ switches $920_2$-$920_6$. In this manner, at least some of the flooding of LFMs that would otherwise occur is prevented, thereby reducing the number of LFMs propagated within the network. Thus, in one embodiment, given availability of information specifying which ingress interfaces bring in traffic going towards a particular node, LFMs may be selectively flooded only on those interfaces.

FIG. 10 depicts an exemplary central control plane architecture. As depicted in FIG. 10, the exemplary central control plane architecture 1000 includes a controller 1010 and seven switches $1020_1$-$1020_7$ (collectively, switches 1020). The controller 1010 and switches 1020 are connected in a linear chain topology, with controller 1010 coupled to switch $1020_1$, switch $1020_1$ coupled to switch $1020_2$, and so on, ending with switch $1020_6$ coupled to switch $1020_7$. In exemplary central control plane architecture 1000, if switch $1020_1$ has a flow for switch $1020_7$, it will have to traverse switches $1020_2$ through $1020_6$ before reaching switch $1020_7$. As a result, whenever the link connecting switches $1020_6$ and $1020_7$ fails, the resulting LFM will have to traverse all of the switches 1020 in order to reach switch $1020_1$, which is similar to flooding. However, in most cases the network topology will be more complex than a simple linear chain topology and, thus, inclusion of ingress ports within flow table of switches will lead to significant advantages when link failures occur.

Figure 11:
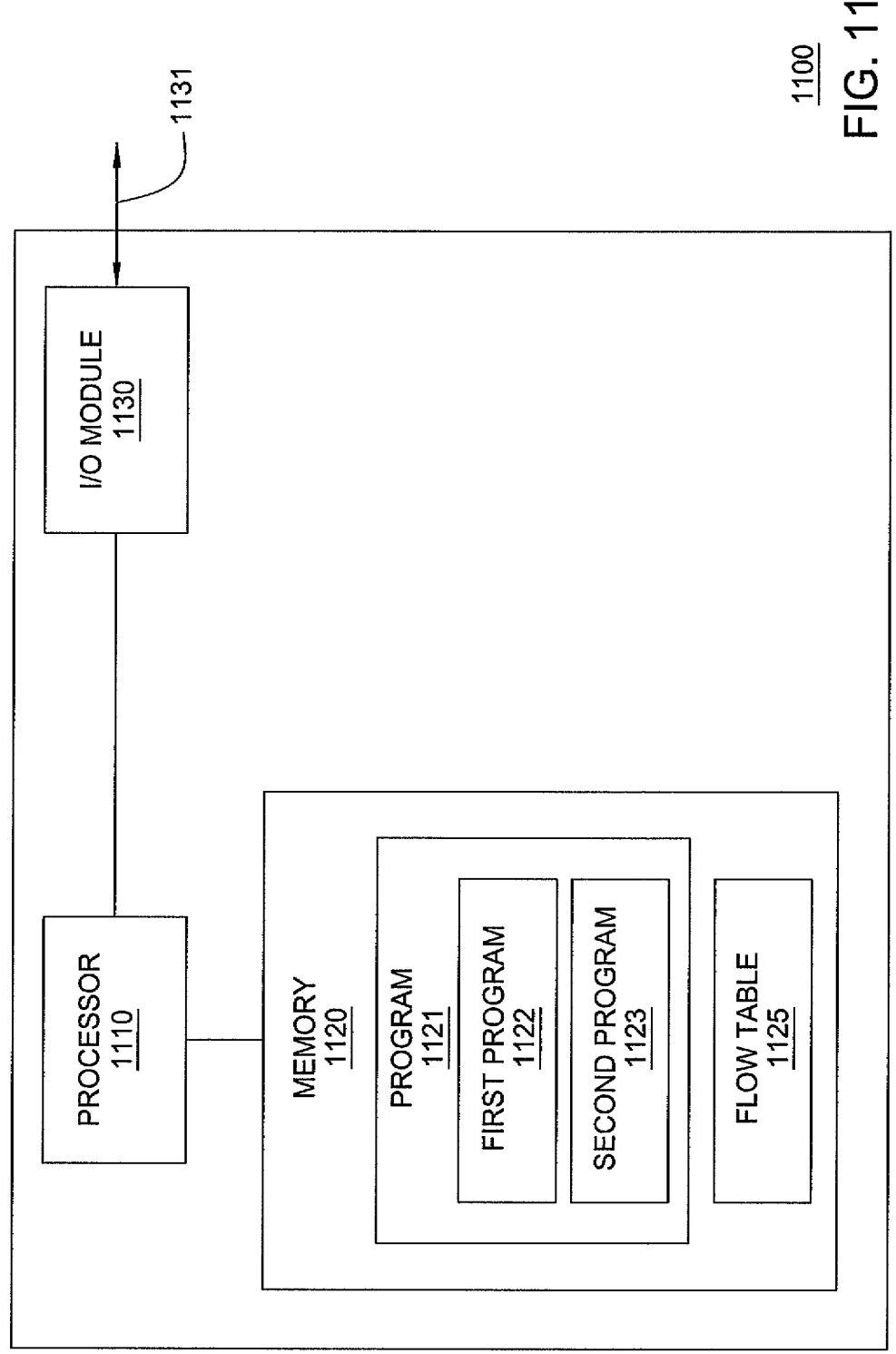
FIG. 11 depicts a high-level block diagram of a switch configured for supporting the failed link reporting capability.

FIG. 11 depicts a high-level block diagram of a switch configured for supporting the failed link reporting capability.

As depicted in FIG. 11, switch 1100 includes a processor 1110, a memory 1120, and an input-output (I/O) module 1130, which cooperate to provide various functions as depicted and described herein.

The I/O module 1130 may support one or more interfaces to other switches and devices via one or more associated communication links (e.g., via a communication link 1131).

The memory 1120 includes programs 121 and a flow table 125. The programs 1121 include a first program 1122 configured for enabling the switch 1100 to provide functions of the failed link reporting capability when the switch 1100 detects a link failure (e.g., as depicted and described with respect to FIGS. 3-5) and a second program 1123 configured enabling the switch 1100 to provide functions of the failed link reporting capability when the switch 1100 receives an LFM (e.g., as depicted and described with respect to FIGS. 6-8). The processor 1110 is configured to execute the first program 1122 and the second program 1123 for providing the various functions of the failed link reporting capability associated therewith, respectively. The processor 1110 is configured to access flow table 1125 for supporting various functions of the failed link reporting capability (e.g., for determining switches to which to send LFMs using flow entries of flow table 1125, for updating flow entries of flow table 1125, and the like, as well as various combinations thereof). The processor 1110 is configured for controlling receiving and sending of data packets, LFMs, and other information via I/O module 1130. The processor 1110 may support or provide any other capabilities for enabling operation of switch 1110 in accordance with the failed link reporting capability.

As will be appreciated, switch 1100 is suitable for use as any of the switches depicted and described. In one embodiment, the combination of the algorithms and the flow table may be considered to provide the FLPM 130 of any of the elements of FIG. 1. Although primarily depicted and described herein with respect to embodiments in which the ingress and egress interfaces are specified in terms of port numbers, it will be appreciated that any other suitable parameter(s) may be used to specify ingress and/or egress interfaces. In one embodiment, for example, next-hop neighbor IP addresses may be used instead of port numbers for specifying the ingress and/or egress interfaces. For example, in a SoftRouter architecture using the DynaBind algorithm or Forwarding and Control Element Separation (ForCES) protocol, in which switches may have knowledge of their next-hop neighbors, the next-hop neighbor IP addresses may be used in place of port numbers for specifying ingress and egress interfaces. Any other suitable parameter(s) and associated values may be used. In this manner, the terms ingress interface and egress interface may encompass any types of parameters and values which may be used in accordance with the failed link reporting capability.

Although primarily depicted and described herein with respect to embodiments in which ingress interface information is included within the flow table entries of all switches, it will be appreciated that there may be cases in which such an implementation is not possible. In such cases, it may be necessary to perform at least some level of flooding of LFMs to switches in the network. It will be appreciated, however, that any such flooding could increase the risk of LFMs remaining in the network indefinitely, if steps are not taken to prevent such an occurrence. Accordingly, in one such embodiment the LFM generated by the switch associated with the failed link may be configured to include one or more parameters adapted for use in preventing LFMs from remaining in the network indefinitely. In one embodiment, for example, a Hop Count parameter is included within the initial LFM generated for a failed link. In one such embodiment, the value of the Hop Count parameter is an integer that is decreased by one for each hop as the LFMs is forwarded within the network, such that a switch receiving the LFM when the value of the Hop Count parameter is zero will stop forwarding the LFM. In one embodiment, for example, a Time-To-Live (TTL) parameter is included within the initial LFM generated for a failed link. In one such embodiment, the value of the TTL parameter is an time stamp that decreases over time, such that a switch receiving the LFM when the value of the TTL parameter is zero will stop forwarding the LFM. In such embodiments, it will be appreciated that the values of such parameters need to be chosen based on factors such as the size of the network. For example, if the parameter value is small when the size of the network is large, the LFM may not be distributed to all switches that should receive the LFM. Similarly, if the parameter value is large when the size of the network is small, the LFM may remain in the network longer than necessary and, thus, longer than is desirable.

Although primarily depicted and described herein with respect to embodiments in which the failed link reporting capability is performed by switches of a central control plane architecture, it will be appreciated that the failed link reporting capability may be performed by any other suitable types of nodes or devices of a central control plane architecture.

Although primarily depicted and described herein with respect to embodiments in which the failed link reporting capability is implemented within a central control plane architecture, it will be appreciated that the failed link reporting capability may implemented in any other suitable types of network architectures.

Figure 12:
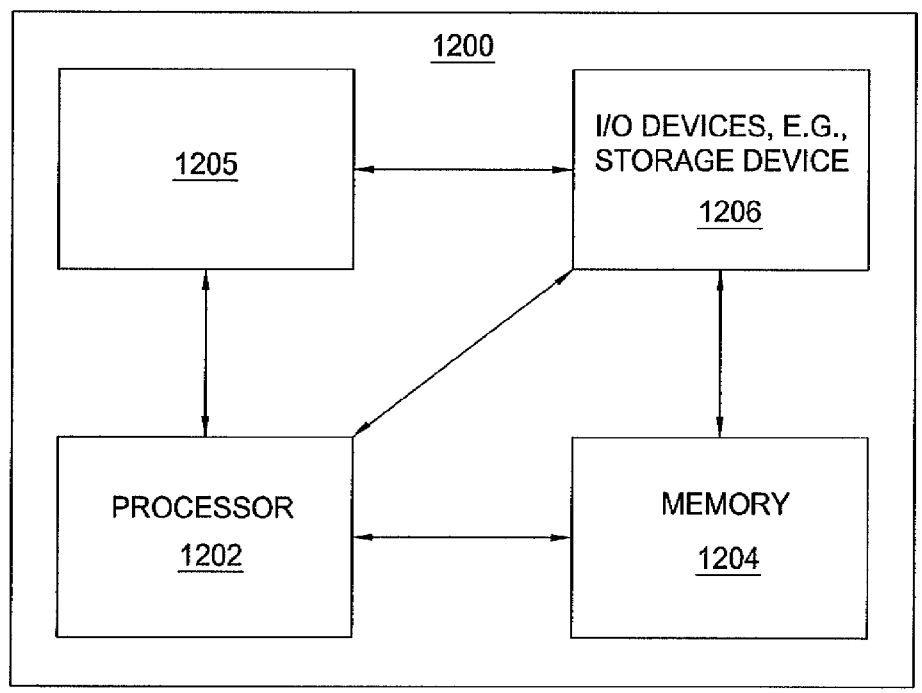
FIG. 12 depicts a high-level block diagram of a computer suitable for use in performing the functions described herein.

FIG. 12 depicts a high-level block diagram of a computer suitable for use in performing functions described herein.

As depicted in FIG. 12, computer 1200 includes a processor element 1202 (e.g., a central processing unit (CPU) and/or other suitable processor(s)), a memory 1204 (e.g., random access memory (RAM), read only memory (ROM), and the like), an cooperating module/process 1205, and various input/output devices 1206 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 1205 can be loaded into memory 1204 and executed by processor 1202 to implement the functions as discussed herein. Thus, cooperating process 1205 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal-bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for reporting a failure of a link associated with a node, the method comprising:
    detecting a failure of a link associated with the node;
    identifying an interface of the node associated with the failed link;
    identifying, from a flow table of the node, an ingress interface of the node via which a flow intended for the failed link is received;
    generating a link failure message for the identified ingress interface; and
    sending the link failure message via the identified ingress interface.

2. The method of claim 1, wherein identifying an ingress interface of the node via which a flow intended for the failed link may be received comprises:
    searching the flow table of the node for identifying a flow table entry comprising an Action field indicative that packets of the flow are to be forwarded to the interface of the node associated with the failed link; and
    determining the ingress interface from the identified flow table entry.

3. The method of claim 2, wherein the ingress interface is determined from an ingress interface field of the identified flow table entry.

4. The method of claim 1, wherein the link failure message comprises a Source Address field, a Message Identifier field, a Flow Definition field, a Flow Count field, and at least one Flow Def. # field.

5. The method of claim 1, wherein:
    for each flow that is (1) received via the ingress interface via which the link failure message is sent and (2) transmitted via the interface of the node associated with the failed link, the link failure message comprises a definition of the flow.

6. The method of claim 1, further comprising:
    for each flow that is (1) received via the ingress interface via which the link failure message is sent and (2) transmitted via the interface of the node associated with the failed link, modifying an Action field of a flow table entry of the flow.

7. The method of claim 6, wherein modifying the Action field of the flow table entry of the flow comprises one of:
    modifying the Action field to indicate that packets for the flow should be dropped by the node; and
    modifying the Action field to indicate that packets for the flow should be forwarded, by the node, toward a controller configured for controlling the node.

8. An apparatus for reporting a failure of a link associated with a node, the apparatus comprising:
    a processor configured for:
        detecting a failure of a link associated with the node;
        identifying an interface of the node associated with the failed link;
        identifying, from a flow table of the node, an ingress interface of the node via which a flow intended for the failed link may be received;
        generating a link failure message for the identified ingress interface; and
        sending the link failure message via the identified ingress interface.

9. A method for use at a local node comprising a flow table, the method comprising:
    receiving a link failure message indicative of a link failure detected at a remote node, wherein the link failure message comprises a flow definition of a flow received at the remote node from the local node;
    identifying an interface of the local node via which the link failure message is received;
    identifying, from the flow table of the local node, an ingress interface of the local node via which a flow intended for the failed link is received;
    generating a new link failure message for the identified ingress interface of the node; and
    sending the new link failure message via the identified ingress interface of the local node.

10. The method of claim 9, wherein identifying the ingress interface of the local node comprises:
    searching the flow table of the node for identifying a flow table entry (1) having an Action field indicative that the flow is forwarded via the identified interface of the local node via which the link failure message is received and (2) having a flow definition matching the flow definition of the flow indicated in the received link failure message; and
    determining the ingress interface from the identified flow table entry of the local node.

11. The method of claim 10, wherein the ingress interface is determined from an ingress interface field of the identified flow table entry.

12. The method of claim 11, wherein the flow definition of the flow of the received link failure message represents a subset of flows defined in the flow table entry of the local node, the method further comprising:

splitting the flow table entry into two flow table entries;
modifying an Action field of one of the two flow table entries.

13. The method of claim 9, wherein the received and new link failure messages each comprise a Source Address field, a Message Identifier field, a Flow Definition field, a Flow Count field, and at least one Flow Def. # field.

14. The method of claim 9, wherein the received link failure message includes a Message Identifier field having a Message Identifier value.

15. The method of claim 14, wherein the new link failure message includes a Message Identifier field including the Message Identifier value from the Message Identifier field of the received link failure message.

16. The method of claim 9, wherein:
for each flow that is (1) received via the ingress interface via which the new link failure message is sent and (2) transmitted via the interface of the local node via which the link failure message is received, the new link failure message comprises a definition of the flow.

17. The method of claim 16, wherein, for each flow, the definition of the flow that is included within the new link failure message is the flow definition from the associated flow table entry of the flow.

18. The method of claim 9, further comprising:
for each flow (1) received via the ingress interface via which the new link failure message is sent and (2) transmitted via the interface of the local node via which the link failure message is received, modifying an Action field of a flow table entry of the flow.

19. The method of claim 18, wherein modifying the Action field of the flow table entry of the flow comprises one of:
modifying the Action field to indicate that packets for the flow should be dropped by the local node; and
modifying the action field to indicate that packets for the flow should be forwarded, by the local node, toward a controller configured for controlling the local node.

20. An apparatus for use at a local node comprising a flow table, the apparatus comprising:
a processor configured for:
receiving a link failure message indicative of a link failure detected at a remote node, wherein the link failure message comprises a flow definition of a flow received at the remote node from the local node;
identifying an interface of the local node via which the link failure message is received;
identifying, from the flow table of the local node, an ingress interface of the local node via which a flow intended for the failed link is received;
generating a new link failure message for the identified ingress interface of the node; and
sending the new link failure message via the identified ingress interface of the local node.

* * * * *